(12) United States Patent
Sayed

(10) Patent No.: US 12,257,955 B2
(45) Date of Patent: *Mar. 25, 2025

(54) DISPLAY CASE FOR MOBILE DEVICES

(71) Applicant: Mohammad Sayed, Watertown, MA (US)

(72) Inventor: Mohammad Sayed, Watertown, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/956,466

(22) Filed: Sep. 29, 2022

(65) Prior Publication Data

US 2023/0211738 A1    Jul. 6, 2023

Related U.S. Application Data

(62) Division of application No. 16/255,714, filed on Jan. 23, 2019, now Pat. No. 11,498,493.

(Continued)

(51) Int. Cl.
| | |
|---|---|
| *B60R 11/02* | (2006.01) |
| *A45C 11/18* | (2006.01) |
| *A47B 23/04* | (2006.01) |
| *A61G 5/10* | (2006.01) |
| *B62B 9/26* | (2006.01) |

(Continued)

(52) U.S. Cl.
CPC ............ *B60R 11/02* (2013.01); *A45C 11/182* (2013.01); *A47B 23/043* (2013.01); *A61G 5/10* (2013.01); *B60R 11/0235* (2013.01); *B62B 9/26* (2013.01); *B62J 50/22* (2020.02); *B62J 50/225* (2020.02); *F16B 1/00* (2013.01); *F16B 47/00* (2013.01); *F16M 11/041* (2013.01); *F16M 11/10* (2013.01); *F16M 11/2021* (2013.01); *F16M 13/005* (2013.01); *F16M 13/022* (2013.01); *A45C 2011/002* (2013.01); *A45C 2011/003* (2013.01); *A45C 2200/15* (2013.01); *A47B 2023/049* (2013.01); *B60R 2011/0056* (2013.01); *B60R 2011/0057* (2013.01); *B60R 2011/0071* (2013.01); *B60R 11/0241* (2013.01);

(Continued)

(58) Field of Classification Search
CPC ......... B60R 2011/0057; B60R 11/0241; B60R 11/0235; B60R 11/02; F16B 2001/0035; F16B 47/00; F16M 13/022; F16M 11/2021; F16M 11/10; F16M 11/041; H04B 1/3888; A61G 5/10; A47B 23/043
See application file for complete search history.

(56) References Cited

U.S. PATENT DOCUMENTS 5,620,163 A * 4/1997 Wu .................. H04B 1/38
                                                    248/688
6,003,831 A    12/1999 Coleman
(Continued)

*Primary Examiner* — Christopher Garft
(74) *Attorney, Agent, or Firm* — NIXON PEABODY LLP

(57) ABSTRACT

A mobile device case apparatus and method are provided that include a frame, a stand, at least one magnet, and rubber coating over the at least one magnet. The frame and stand can be 3D-printed. The frame is configured to secure a mobile device into the frame. The frame includes at least one magnet. The bottom of the stand can have a rubber coating to prevent the case from slipping when the case adheres to a metal. The stand is configured to support the weight of the apparatus and prop the mobile device up for viewing. The stand can also be configured to be a receive a mechanical element of a vehicle such as a wheelchair.

20 Claims, 11 Drawing Sheets

Related U.S. Application Data

(60) Provisional application No. 62/620,871, filed on Jan. 23, 2018.

(51) Int. Cl.

| | | |
|---|---|---|
| *B62J 50/21* | (2020.01) | |
| *B62J 50/22* | (2020.01) | |
| *F16B 1/00* | (2006.01) | |
| *F16B 47/00* | (2006.01) | |
| *F16M 11/04* | (2006.01) | |
| *F16M 11/10* | (2006.01) | |
| *F16M 11/20* | (2006.01) | |
| *F16M 13/00* | (2006.01) | |
| *F16M 13/02* | (2006.01) | |
| *A45C 11/00* | (2006.01) | |
| *B60R 11/00* | (2006.01) | |

(52) U.S. Cl.
CPC ....... *B60R 11/0252* (2013.01); *F16B 2200/83* (2023.08)

(56) References Cited

U.S. PATENT DOCUMENTS

| | | | |
|---|---|---|---|
| 6,651,943 B2 | 11/2003 | Cho | |
| 7,301,759 B2 | 11/2007 | Hsiung | |
| 7,841,575 B1 | 11/2010 | Sliger | |
| 7,845,612 B2 * | 12/2010 | Mase | H05K 5/0204 248/176.1 |
| 8,016,107 B2 | 9/2011 | Emsky | |
| 8,282,060 B2 | 10/2012 | Fan | |
| 8,474,609 B1 | 7/2013 | Hong | |
| 8,693,192 B2 | 4/2014 | Hsieh | |
| 8,720,843 B1 | 5/2014 | Chen | |
| 8,746,650 B2 | 6/2014 | Curatolo | |
| 8,960,421 B1 | 2/2015 | Diebel | |
| 9,644,783 B2 | 5/2017 | Rinner | |
| 9,768,822 B1 * | 9/2017 | Loh | H04M 1/185 |
| 10,117,505 B1 | 11/2018 | Alvarez | |
| 10,173,292 B2 | 1/2019 | Fullerton | |
| 2007/0075208 A1 | 4/2007 | Chen | |
| 2008/0006745 A1 | 1/2008 | Chong | |
| 2009/0206592 A1 | 8/2009 | Summerhayes | |
| 2012/0025039 A1 * | 2/2012 | Segal | F16M 11/38 248/188.6 |
| 2012/0246885 A1 | 10/2012 | Fullerton | |
| 2013/0102368 A1 * | 4/2013 | Lee | H04B 1/3888 455/575.8 |
| 2014/0004915 A1 | 1/2014 | Huang | |
| 2014/0066142 A1 | 3/2014 | Gipson | |
| 2014/0347795 A1 | 11/2014 | Baca | |
| 2015/0011265 A1 | 1/2015 | Walsh, Jr. | |
| 2016/0113368 A1 * | 4/2016 | Tu | A45C 11/00 206/45.23 |
| 2016/0173160 A1 * | 6/2016 | Gronewoller | H04B 1/3888 455/575.8 |
| 2016/0173670 A1 | 6/2016 | Langhein | |
| 2016/0323430 A1 | 11/2016 | Fiori | |
| 2016/0359513 A1 | 12/2016 | Alvarez, III | |
| 2017/0026498 A1 * | 1/2017 | Goldfain | H02J 7/342 |
| 2017/0134062 A1 | 5/2017 | Erickson | |
| 2017/0359095 A1 * | 12/2017 | Fleckenstein | F16M 11/24 |
| 2017/0366652 A1 | 12/2017 | Boerckel | |
| 2018/0191395 A1 | 7/2018 | Chung | |
| 2019/0307218 A1 * | 10/2019 | Chung | B32B 27/36 |
| 2020/0170392 A1 * | 6/2020 | Freimuth | A45F 5/00 |

\* cited by examiner

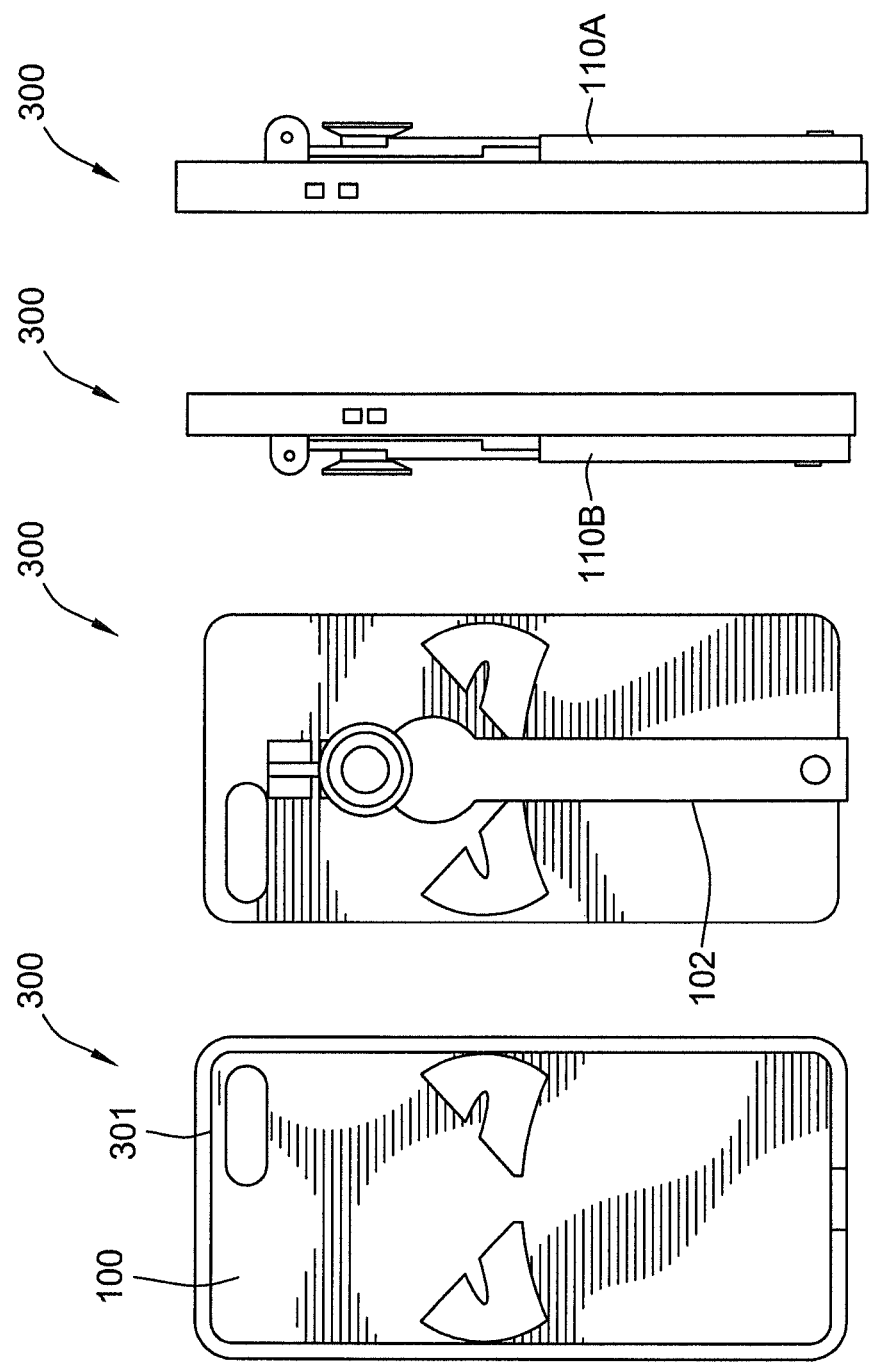

DISPLAY CASE FOR MOBILE DEVICES

CROSS-REFERENCE TO RELATED APPLICATIONS

This application is a divisional of U.S. patent application Ser. No. 16/255,714, filed Jan. 23, 2019, now issued as U.S. Pat. No. 11,498,493, which is hereby incorporated by reference herein in its entirety.

FIELD OF THE INVENTION

The disclosure relates generally to display cases for mobile devices, and more particularly to apparatus and methods for displaying a tablet or handheld device.

BACKGROUND

It is desirable to stand up mobile devices on their own to view content or use the device. Often, phone cases which allow a device to stand on its own with a viewable display are bulky and do not allow for a variable adjustment of the viewing angle. Conventional cases can be difficult to snap onto a device and too bulky to operate such that the case must be immediately removed before the device can be used for anything besides viewing the display.

Traditionally, conventional phone cases that allow a device to stand on its own can only be used on a flat surface. Users need their devices to be secure and viewable without having to hold them in a variety of different locations such as the kitchen, bathroom, bedroom, workplace, or any other location which does not have table or counter space available. Users who either have difficulty holding a device or simply do not wish to hold it cannot easily view their device. Users in wheelchairs or who otherwise have restricted movement are particularly affected by this inability to use their mobile devices hands-free.

What is needed is a case that can easily snap on and off a device, which allows for a flexible viewing angle and which allows for variety in the locations that the case can be used.

SUMMARY

The present disclosure provides a mobile device case apparatus. The mobile device case apparatus includes at least a frame, a pivot joint, a stand, at least one magnet, and a coating over the bottom of the stand. The frame is configured to secure a mobile device without movement. The stand can bear the weight of the frame and the mobile device. The pivot joint connects the stand to the frame and can allow variability for viewing angles. The at least one magnet can adhere the case apparatus to a metal object. The coating over the bottom of the stand covers the at least one magnet and is configured to increase the friction between the magnet and a metal. The increase in friction prevents the case from sliding downwards when the at least one magnet adheres to a metal.

In one aspect of the present disclosure, the mobile device case also includes a suction cup attached to the frame and configured to bear the weight of the case and the mobile device.

In another aspect of the present disclosure, the stand is an adapter configured to receive a mechanical element. In some embodiments of the disclosure, the stand could receive a mechanical element of a wheelchair, bicycle, stroller, scooter, or other vehicle.

In another aspect of the present disclosure, the frame can include a card holder for securing at least one plastic card having dimensions of roughly 86 millimeters (mm) by 54 mm.

In another aspect of the present disclosure, a magnet can be located at the bottom of the stand. The stand can be rotated to allow the user to pick up something by the magnetic force of the magnet when holding the phone.

The frame and stand can be 3D-printed from a virtual model of the frame and stand according to the various embodiments of the present disclosure.

Additional features and advantages of the disclosure will be set forth in the description that follows, and in part, will be obvious from the description, or can be learned by practice of the principles disclosed herein. The features and advantages of the disclosure can be realized and obtained by means of the instruments and combinations particularly pointed out in the appended claims. These and other features of the disclosure will become fully apparent from the following description and appended claims, or can be learned by the practice of the principles set forth herein.

BRIEF DESCRIPTION OF THE DRAWINGS

In order to describe the manner in which the above-recited and other advantages and features of the disclosure can be obtained, a more particular description of the principles described above will be rendered by reference to specific examples illustrated in the appended drawings. These drawings depict only example aspects of the disclosure, and are therefore not to be considered as limiting of its scope. The principles are described and explained with additional specificity and detail through the use of the following drawings.

FIG. 3A shows a front perspective view of a case according to an embodiment of the present disclosure.

FIG. 3B shows a rear perspective view of a case according to an embodiment of the present disclosure.

FIG. 3C shows a side perspective view of a case according to an embodiment of the present disclosure.

FIG. 3D shows a side perspective view of a case according to an embodiment of the present disclosure.

DETAILED DESCRIPTION

Figure 1A:
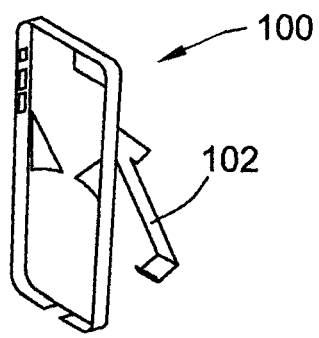
FIG. 1A shows a perspective view of a mostly enclosed mobile device case according to an embodiment of the present disclosure.

The present invention is described with reference to the attached figures, wherein like reference numerals are used throughout the figures to designate similar or equivalent elements. The figures are not drawn to scale, and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details, or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

As discussed above, there is significant interest in providing a mobile device case that allows for a variety of viewing angles and locations. In particular, there is significant interest in developing mechanisms that: (1) allow the mobile device case to stand independently at a variety of locations; and (2) allow the mobile device case to be viewed on a variety of objects through mechanical fixtures, suction cups, or magnet elements. Some embodiments of the present application disclose a receiving element which allows the case to connect to vehicles to allow the user to view the mobile device while on a vehicle. "Mobile device" refers to a portable electronic device that may be fitted with a case, including a phone, a tablet, an iPad, an iPhone, a laptop, a desktop, or a pager.

FIG. 1A shows a frame 100, which entirely encloses an mobile device (not shown) according to an embodiment of the present disclosure. The frame 100 can also be configured to fit various types of mobile phones. The frame 100 allows for features of the phone to be unenclosed, such as the volume buttons, the charging port, headphone jack, and the camera (not shown). Other additional features of a phone may be unenclosed as well. Also pictured is a stand 102 located on the back of the frame 100, which is configured to prop up the frame 100. The stand 102 can be attached anywhere to the frame 100. In this illustrated embodiment, the stand 102 is configured to attach to the top of the frame 100.

Figure 1B:
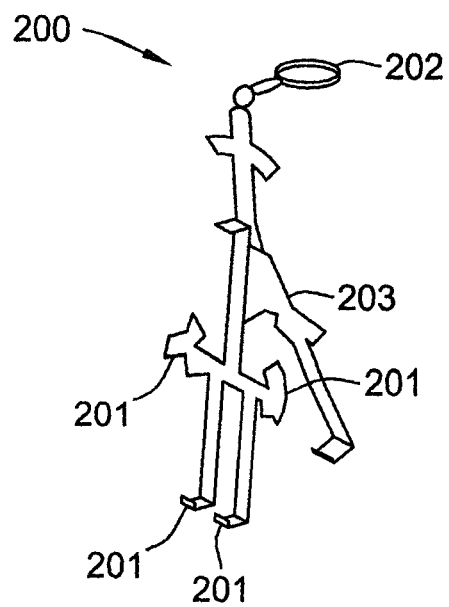
FIG. 1B shows a perspective view of a mostly unenclosed mobile device case according to an embodiment of the present disclosure.

FIG. 1B shows a minimalist frame 200 that attaches to mobile device (not shown) through five attachment points 201, but does not entirely enclose the mobile device. As pictured, one attachment point 201 is at the top of the mobile device. Two attachment points 201 are on the bottom of the mobile device, and one attachment point is on each side of the mobile device. The attachment points 201 can be anywhere on the mobile device so long as the frame 200 is secured to the mobile device by the attachment points 201. There can be any number of attachment points 201, but there must be at least two attachment points 201. FIG. 1B also shows a circular receiving element 202 at the top of the case. This receiving element is detachable and can receive a mechanical element (not shown) of a wheelchair, bicycle, stroller, scooter, or other similar vehicle. FIG. 1B also shows a stand 203 located on the back of the frame 200, which is configured to prop up the frame 200. The stand 203 is attached to the top of the frame 200, but can be attached anywhere on the back of the frame 200.

Figure 1C:
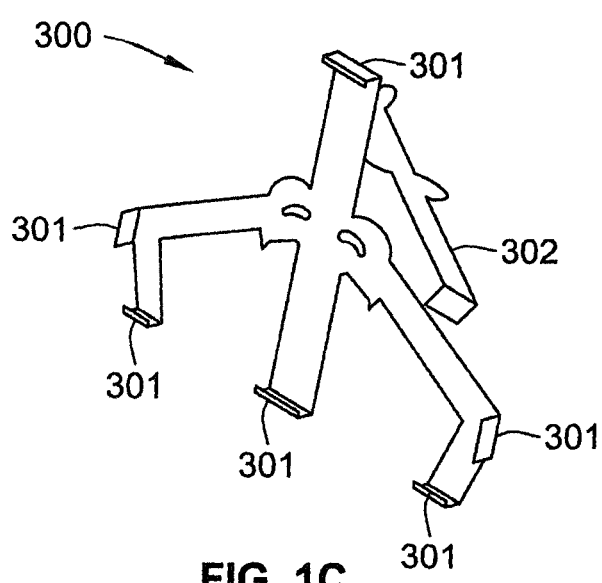
FIG. 1C shows a perspective view of a mostly unenclosed tablet case with six attachment points according to an embodiment of the present disclosure.

FIG. 1C shows a minimalist frame 300, according to an embodiment of the present disclosure. The frame 300 attaches to a tablet (not shown) through six attachment points 301. Three attachment points 301 are on the bottom of the tablet. One attachment point 301 is on the top and each side of the tablet. The attachment points 301 can be placed anywhere on the sides of the tablet device so long as the attachment points 301 secure the frame to the tablet. There can be any number of attachment points 301, but there must be at least two attachment points 301. The attachment points 301 can also be in any configuration. The attachment points 301 are currently configured to not enclose any design features of the tablet device that the user might interact with such as volume buttons, camera, charging ports, or headphone jacks (not shown). Also pictured is a stand 302 located on the back of the frame 300, which is configured to prop up the frame 300. The stand 302 is attached to the top of the frame 300, but can be attached anywhere on the frame 300.

Figure 1D:
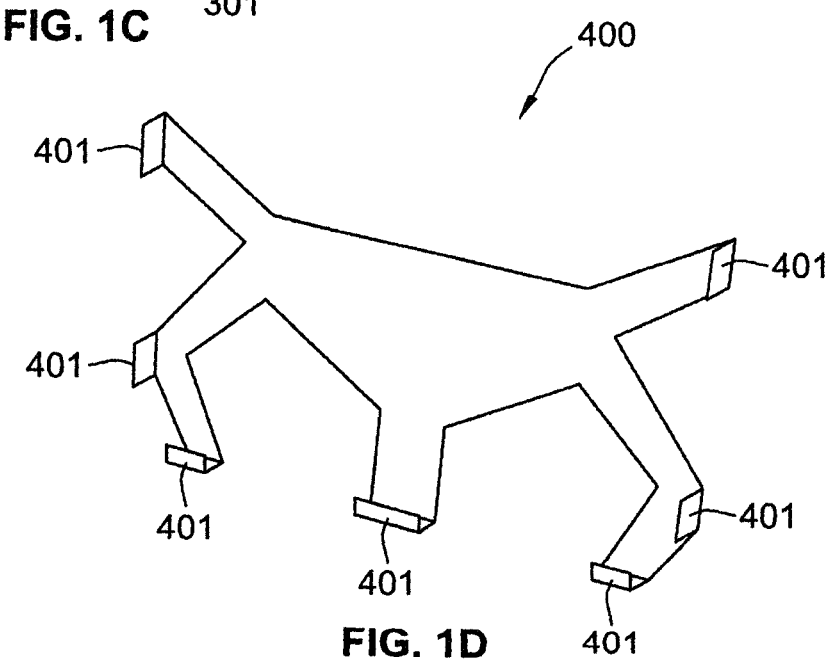
FIG. 1D shows a perspective view of a mostly unenclosed tablet case with seven attachment points according to an embodiment of the present disclosure.

FIG. 1D shows a frame 400 that is configured to secure a tablet (not shown) through seven attachment points 401. Once the tablet is attached, three attachment points 401 are on the bottom of the tablet. Each side of the tablet also has two attachment points 401. There can be any number of attachment points 401 to the tablet so long as there are at least two attachment points 401. Although not pictured, this frame can also have a suction cup attachment and a stand.

Figure 2:
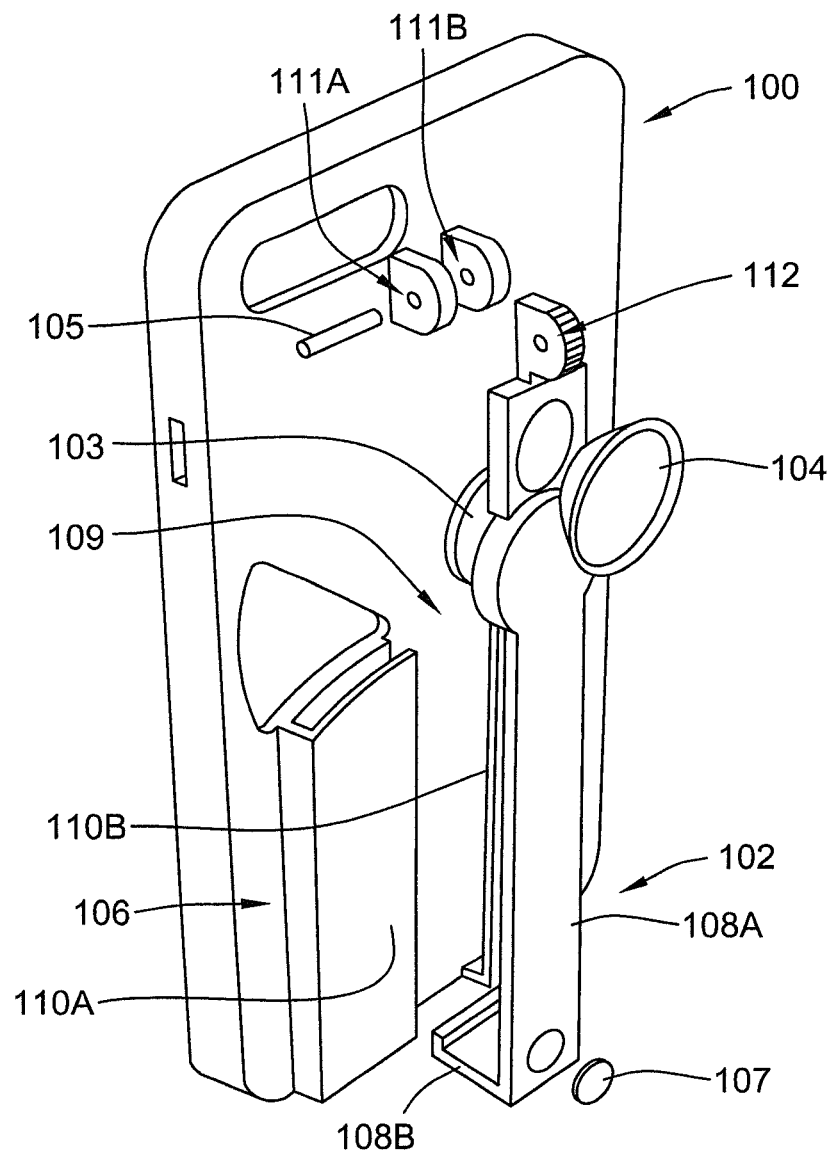
FIG. 2 shows a rear perspective view of a mobile device case according to an embodiment of the present disclosure.
Figure 5:
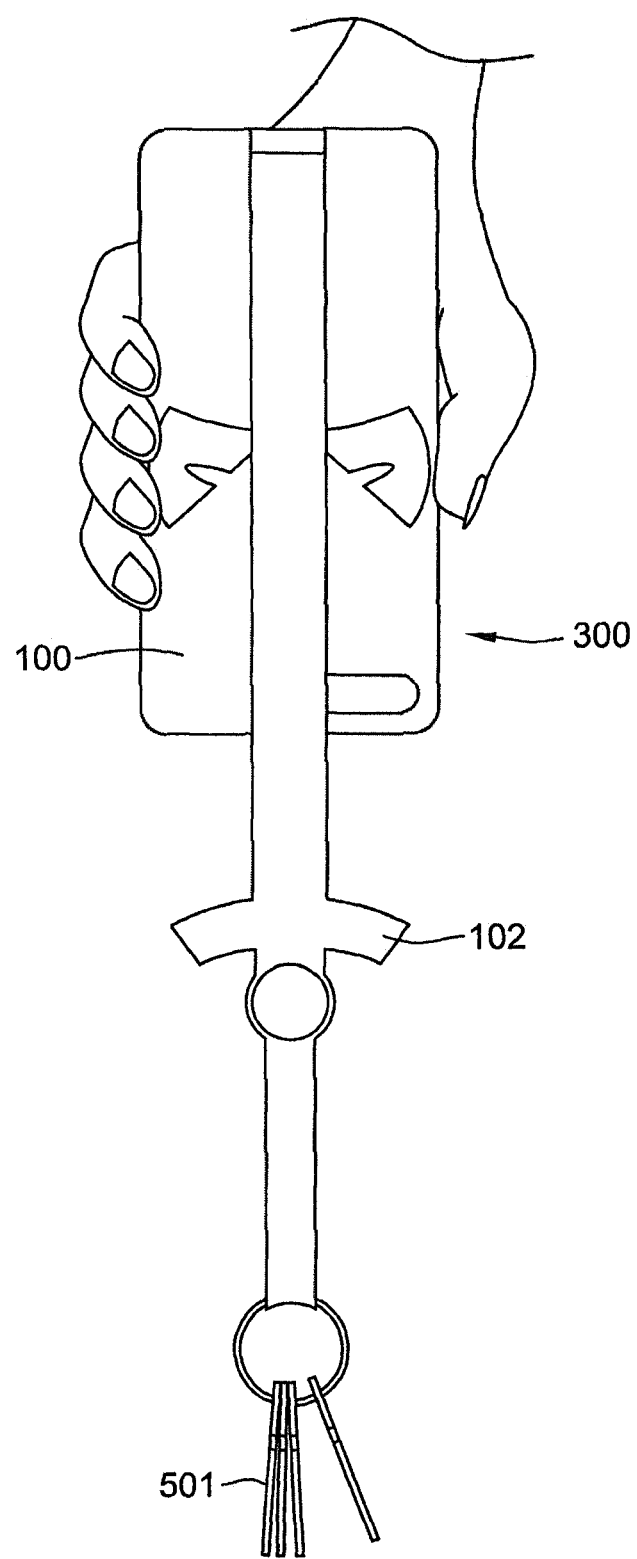
FIG. 5 shows the case according to an embodiment of the invention where the magnet on the stand of the case is configured to pick up items.

FIG. 2 shows an exploded view of the elements of the frame 100, according to an embodiment of the present disclosure. FIG. 2 shows a frame with a rod 105, a first magnet 103, a suction cup 104, an incorporated card holder 106, a stand 102, and a second magnet 107. The frame 100 is configured to contain a mobile device (not shown). The stand 102 includes a body 108A and a base 108B that extend at a right angle relative to the body 108A. In FIG. 2, the stand 102 is in a first position. In FIG. 5, the stand 102 is in a second position. When the stand 102 is in the first position, the base 108B is positioned adjacent to a bottom end of the frame 100. The rod acts 105 as a pivot joint and connects the stand 102 to the frame 100. The rod 105 is inserted through at least one of the apertures 111A and 111B in the frame 100, and through at least the aperture 112 in the stand 102, near a top end of the frame 100. The stand 102, once connected to the frame 100 with the rod 105, can be rotated 180 degrees, to allow for a full range of viewing angles. The rod 105 is configured to open with appropriate force from the user but will not slide open solely from the pressure of the frame 100 weighing against the stand 102 when the mobile device is propped up by the frame 100 for viewing. The rod 105 can also be a small screw similar to those used in watches or eyeglasses. A first magnet 103 is incorporated into the stand 102 and can adhere the frame 100 to a metal object. The first magnet 103 can have an 18 mm diameter and a 3 mm width. The first magnet 103 can also have smaller or larger dimensions but must not be wider than the width of the stand and must allow the stand 102 to lie flush with the frame 100. When the stand 102 is in the first position (FIG. 2), the first magnet 103 is positioned between the frame 100 and the stand 102. When the stand 102 is in the second position (FIG. 5), the stand 102 is positioned between the frame 100 and the first magnet 103.

FIG. 2 demonstrates a card holder 106 that can be incorporated into the frame 100. The cardholder 106 includes a first portion 110A that extends from the frame 100, and a second portion 110B that extends from the frame 100 and is spaced apart from the first portion 110A, to form an opening 109. The first portion 110A is also shown in FIG. 3D, and the second portion 110B is also shown in FIG. 3C. When the stand 102 is in the first position shown in FIG. 2, the stand 102 is positioned within the opening 109, between the first portion 110A and the second portion 110B.

This cardholder 106 can hold at least one plastic cards (not shown) having dimensions of roughly 86 mm by 54 mm. The illustrated card holder 106 can hold up to six plastic cards having dimensions of roughly 86 mm by 54 mm. A card holder 106 could also hold more or less cards. Cards can be placed into the card holder 106 by opening the stand 102 and sliding the cards into the card holder. When cards are in the card holder 106, the stand 102 can still lie flush with the card holder 106. When the stand 102 lies flush with the card holder 106, the stand 102 can secure the cards in the card holder 106. Cards can be removed from the card holder 106 by opening the stand 102 and pushing the cards up through the opening in the card holder 106. This demonstrates the advantages of the present disclosure's card holder 106 over other card holders because the cards can be placed into and retrieved from the card holder with little difficulty and the stand 102 can be used to securely hold the cards in place.

FIG. 2 also shows a suction cup 104. The suction cup 104 can be at the top of the stand 102 and can allow the case to be used in locations that would typically not allow placement of a mobile device case. For example, the suction cup 104 can be affixed to a mirror, a tiled wall, furniture, windows, and other similar items (not shown). The suction cup 104 is removable by the user. The suction cup 104 can also be located anywhere else on the back of the frame 100 or stand 102. When the stand is in the first position (FIG. 2), the suction cup 104 is positioned between the top end of the frame 100 and the bottom end of the frame 100.

Lastly, FIG. 2 also displays a second magnet 107 at the bottom of the stand 102. The second magnet 107 is affixed to the stand 102 through dipping the bottom part of the stand 102 into a coating. This coating adheres the second magnet 107 to the stand. The present embodiment uses Plasti Dip which is a soft rubberized coating. However, any coating can be used which is strong enough to adhere the second magnet 107 to the stand 102. The coating also provides friction when the mobile device is placed against a vertical surface. The friction helps prevent the mobile device from sliding downwards when adhering to a surface through magnets or a suction cup.

FIG. 3A shows a front perspective of a case 300 incorporating the frame 100 of FIG. 1, according to an embodiment of the present disclosure. The case 300 has a rim 301 around the front that is visible when the mobile device is placed in it. The frame 100 can be 3D-printed from thermoplastic polyurethane (TPU) and polylactic acid (PLA). The frame 100 can be 3D-printed from these materials. The infill of the 3D-printed frame can be between 10% and 100%. An embodiment of the present disclosure uses an infill of 15% for the frame to create a flexible, semi-transparent frame. This allows the mobile device to easily snap into the frame. The frame can also be constructed from metal, plastic, acrylic, Plexiglas, carbon fiber, or any other similar material. The frame can also be 3D-printed from a resin 3D-printer which uses a resin material. Resin material can create the necessary flexible, semi-transparent frame.

FIG. 3B shows a rear perspective of the case 300, according to an embodiment of the present disclosure. The rear perspective shows how the case 300 material can allow for a cutaway design. The stand 102 is shown as running down the length of the mobile device. Unlike the material for the frame, the stand 102 is not flexible to support the weight of the case 300 and mobile device (not shown). The stand 102 can be 3D-printed from TPU and PLA but should have a larger infill percentage than the composition of the frame 100. The stand 102 can also be constructed from metal, plastic, acrylic, Plexiglas, carbon fiber, or any other similar material. The stand 102 can also be 3D-printed from a resin 3D-printer which uses a resin material. Resin material can create the necessary less-flexible stand which supports the weight of the case and mobile device.

FIG. 3C and FIG. 3D show side perspectives of a case 300, according to an embodiment of the present disclosure. This demonstrates that the entire case 300 is contained so as to have a flat back. For example, the stand 102 can lay flush with the case 300. In this way, the card holder 106 can be contained underneath the stand 102, and the suction cup 104 can be affixed so that it does not extend much from the case 300.

Figure 4A:
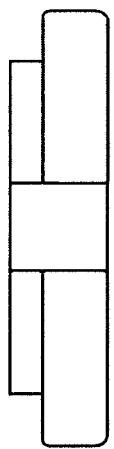
FIG. 4A shows a top perspective view of a case according to an embodiment of the present disclosure.
Figure 4B:
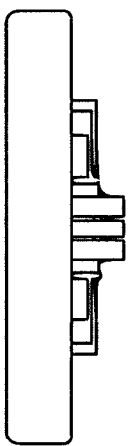
FIG. 4B shows a bottom perspective view of a case according to an embodiment of the present disclosure.

FIG. 4A and FIG. 4B show a top and bottom perspective of an exemplary case 300 according to an embodiment of the present disclosure. This further demonstrates that the case 300 is designed to have a flat profile which allows the case 300 to easily adhere to a vertical surface by magnets or suction cups. The stand can into a cardholder and against the frame to achieve the flat profile. Additionally, FIG. 4B shows that the stand will cover a phone's charging port (not shown) when snapped in. If a user wishes to use the charging port, the stand can be simply snapped out. An alternative embodiment can have the stand snap in at a location that would not cover the charging port. Another alternative embodiment could have the bottom part of the stand removed so that the stand does not snap in and does not cover the charging port.

FIG. 5 shows how a stand 102 can be fully rotated away from the case 300 to a 180-degree angle. This angle allows the stand 102 to operate as an attachment, which is configured to enable retrieval with the magnetic force of the magnet at the bottom of the stand 102. For example, a wheelchair user could open the stand 102 away from the case 300 to pick up a dropped set of keys 501 from the ground. This allows the wheelchair user to remain in the wheelchair and retrieve the keys 501, or other metal objects, without the assistance of another person. Additionally, the coating of the magnet provides additional friction to support the weight of the item that the user picks up with the stand 102.

Figure 6:
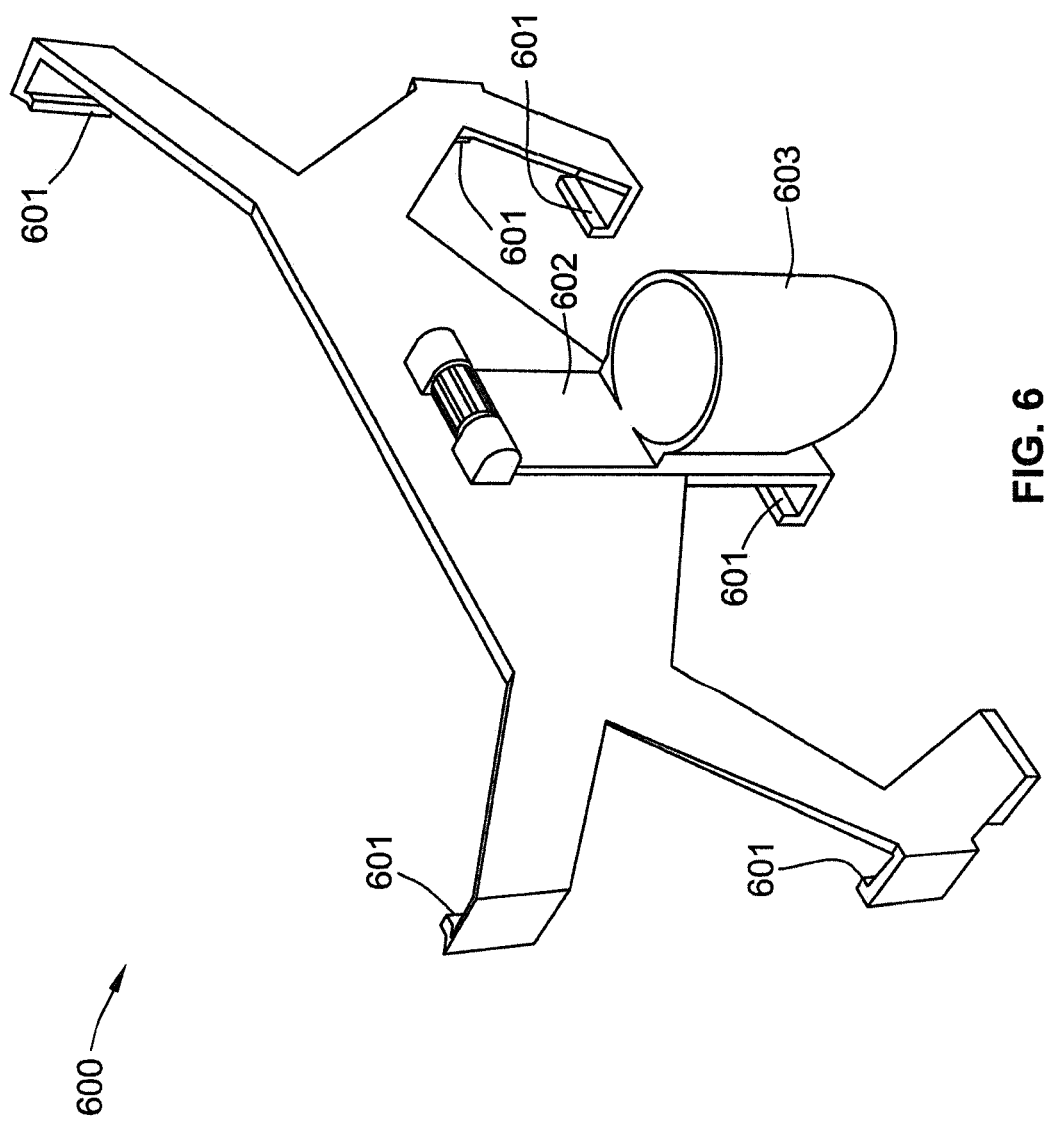
FIG. 6 is a rear perspective view of an exemplary embodiment of the present disclosure.

FIG. 6 shows a rear view of the frame 600 with seven attachment points 601, according to an embodiment of the present disclosure. The frame 600 can include a stand 602 attached to the back of the frame 600. The stand 602 is configured to receive a mechanical element (not shown) from a vehicle. In this exemplary embodiment, the stand 602 includes a circular element 603 configured to receive a pole (not shown) or other circular connecting elements. For example, some wheelchairs have a round pole accessible by the user's hand. The receiving element 603 on the stand 602 can receive a pole on a wheelchair or any other vehicle. The stand 602 can be rotated to allow the user to view the mobile device at a variety of angles.

Figure 7:
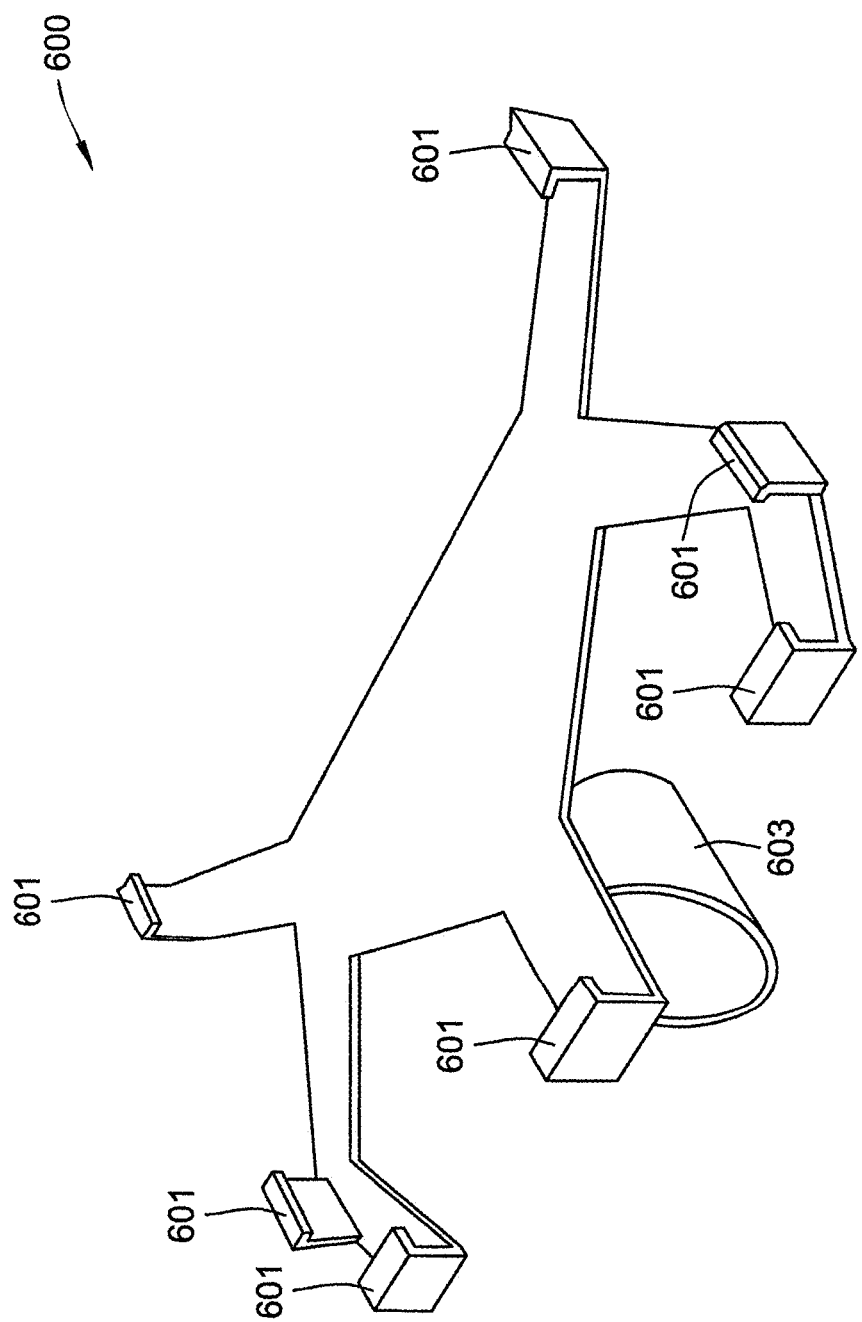
FIG. 7 is a perspective view of an exemplary embodiment of the present disclosure.

FIG. 7 shows a front perspective view of the frame 600. The attachment points 601 are configured to grip a mobile device (not shown). The stand (shown in FIG. 6) does not interfere with the attachment of the frame 600 case to the mobile device. The interior of the frame 600 is smooth so that the frame 600 is flush against the mobile device. It should be understood, there can be two or more attachment points 601. The attachment points 601 are configured to not enclose any features of a mobile device such as a camera, volume buttons, headphone jacks, or charging points (not shown). Furthermore, the back of the frame 600 can have any design. As pictured, the frame 600 is a mostly unenclosed design, but the frame 600 can also entirely enclose the back, as illustrated in FIG. 1A.

Figure 8:
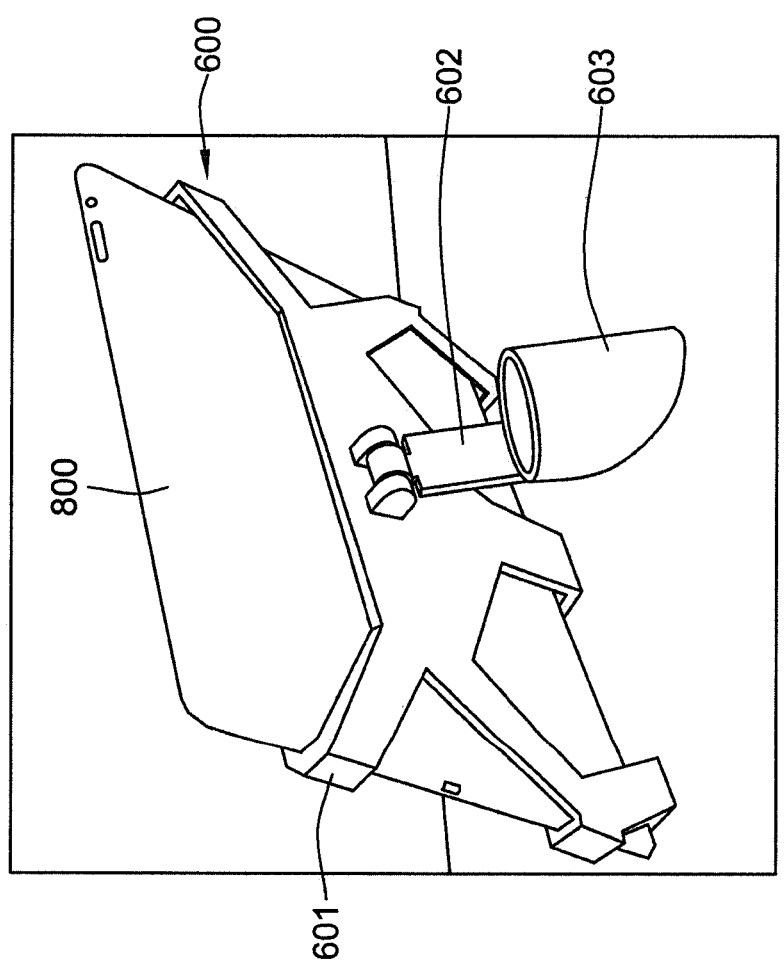
FIG. 8 is a rear perspective view of an exemplary embodiment of the present disclosure holding a mobile device.

FIG. 8 demonstrates the frame 600 with a mobile device 800. FIG. 8 shows the frame 600 actually securing and propping up the mobile device 800. The mobile device 800 can be snapped into the frame 600. As shown, the stand 602 and the circular element 603 can be configured to prop up the mobile device 800 on a horizontal surface.

Figure 9:
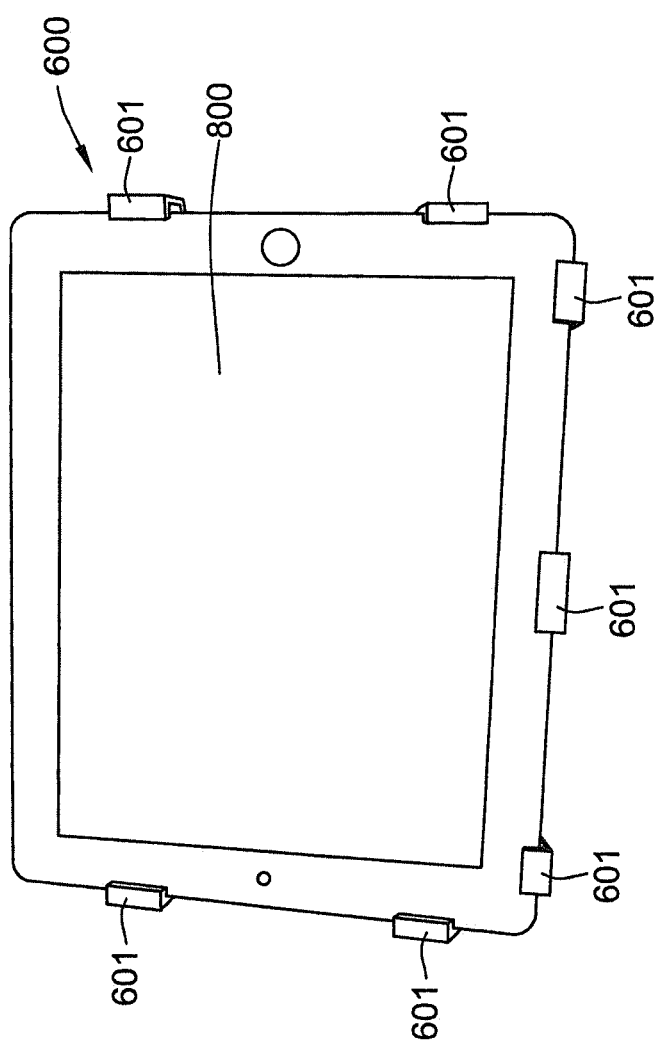
FIG. 9 is a front perspective view of an exemplary embodiment of the present disclosure holding a mobile device.

FIG. 9 demonstrates the frame 600 with the mobile device 800. As illustrated, the mobile device 800 includes a tablet. FIG. 9 also illustrates the attachment points 601 curve around the front of the tablet 800 to securely hold the device in place.

Figure 10:
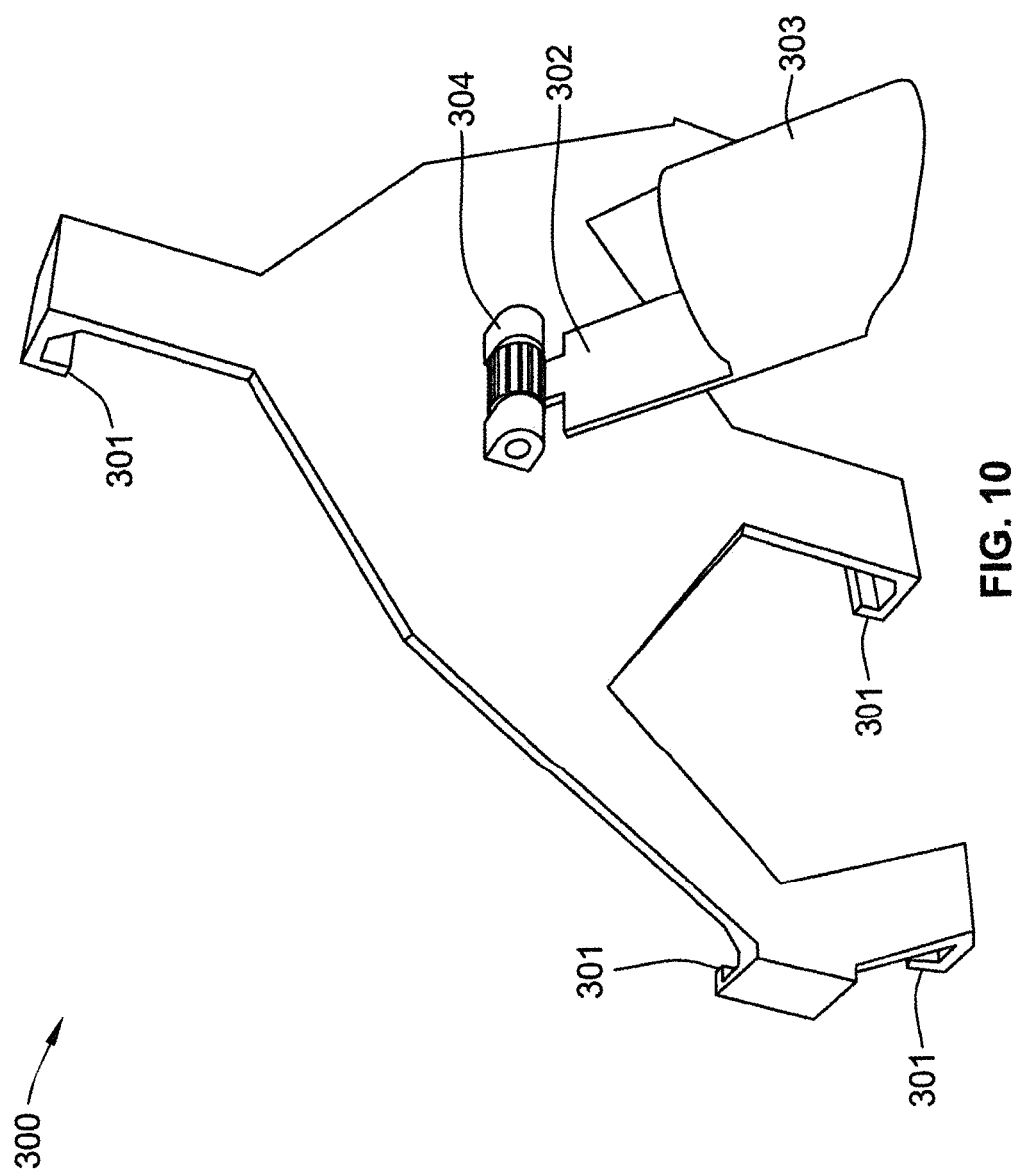
FIG. 10 is a rear perspective view of an exemplary embodiment according to the present disclosure.

FIG. 10 is an illustration of the frame 300 with six attachment points 301, as discussed herein. The frame 300 also illustrates a stand 302 attached. The stand 302 is configured to attach to the frame 300 using a pivot joint 304. The stand 302 can rotate via the pivot joint 304 to any angle. At any angle, the stand 302 can support the weight of the mobile device (not shown) and frame 300 to position the mobile device. The stand 302 can include an adapter 303 configured to receive a mechanical element (not shown) of a wheelchair, bicycle, stroller, scooter, or other vehicle. In this case, the adapter 303 is configured to receive a pole (not shown). In this embodiment, the stand 102 can receive a mechanical element on a Key 2 Freedom wheelchair. Once affixed, the stand 102 can be rotated freely to allow for viewing at a variety of angles.

Figure 12:
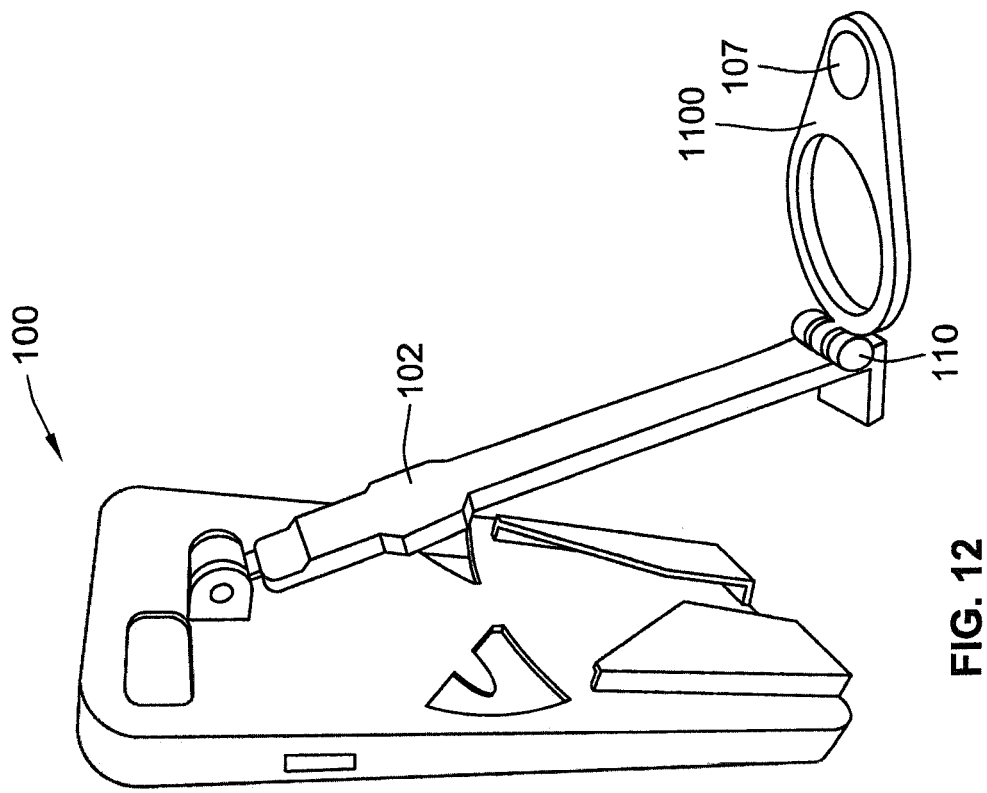
FIG. 12 is a rear perspective view of mobile device case according to the present disclosure.
Figure 11:
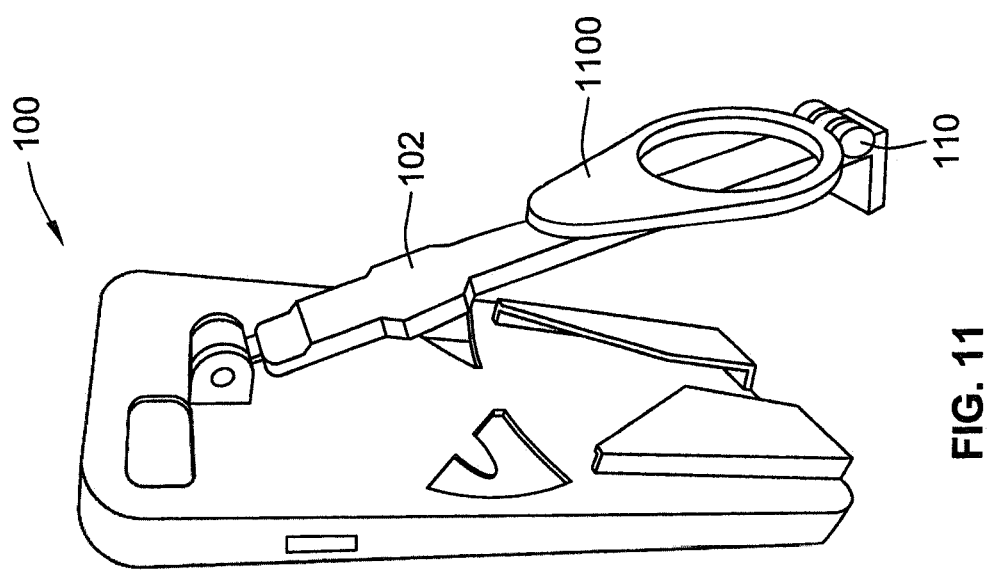
FIG. 11 is a rear perspective view of the mobile device case according to the present disclosure.

FIG. 11 is an illustration of the frame 100 and the stand 102, as discussed herein. The stand 102 is configured to attach to an attachment element 1100. The attachment element 1100 can be positioned at the base of the stand 102. The attachment element 1100 can be configured to attach to the stand 102 a pivot joint 110. The attachment element 1100 can rotate via the pivot joint 110 to any angle. The attachment element 1100 can include the second magnet 107. In this way, the second magnet is extended further from the frame 100. This is helpful in cases where a user is attempting to retrieve an object slightly further away than the example keys in FIG. 5. FIG. 12 illustrates the rotation of the attachment element 1100.

While particular embodiments of the present invention have been shown and described, it will be obvious to those skilled in the relevant arts that changes and modifications may be made without departing from the invention in its broader aspects. Therefore, the aim in the appended claims is to cover all such changes and modifications that fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The terminology used herein is for the purpose of describing particular embodiments only and is not intended to limit the invention. As used herein, the singular forms "a", "an", and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art, and will not be interpreted in an idealized or overly formal sense unless expressly so defined herein.

What is claimed is:

1. A case comprising:
    a frame configured to receive a mobile device;
    a stand coupled to the frame, the stand being movable between a first position and a second position, the stand including a first end pivotally coupled to the frame, and a second end that includes a base extending at a right angle; and
    a card holder including a first portion extending from the frame and a second portion extending from the frame, the first portion and the second portion being configured to receive one or more cards therebetween,
    wherein when the stand is in the first position, at least a portion of the stand is positioned between and flush with the first portion of the card holder and the second portion of the card holder to aid in preventing the one or more cards from being removed from the card holder, and the base of the second end of the stand extends from a back side of the frame to a front side of the frame, and
    wherein when the stand is in to the second position, the portion of the stand is not positioned between the first portion of the card holder and the second portion of the card holder.

2. The case of claim 1, wherein an opening is defined between the frame, the first portion of the card holder, and the second portion of the card holder, the opening being configured to receive the one or more cards therein.

3. The case of claim 1, wherein when the stand is in the first position, the first end of the stand blocks the opening to aid in preventing the one or more cards from being removed from the card holder via the opening.

4. The case of claim 3, wherein when the stand is in the second position, the first end of the stand does not block the opening.

5. The case of claim 1, wherein when the stand is in the first position, the first end of the stand and the second end of the stand are positioned at opposite ends of the opening.

6. The case of claim 1, further comprising a receiving element configured to receive a mechanical element.

7. The case of claim 6, wherein the mechanical element is a mechanical element of a wheelchair, a bicycle, a stroller, a scooter, or any combination thereof.

8. The case of claim 6, wherein the receiving element is coupled to the frame.

9. The case of claim 6, wherein the receiving element is coupled to the stand.

10. The case of claim 1, wherein the mobile device is a phone, a tablet, a desktop computer, or a laptop computer.

11. The case of claim 1, further comprising a first magnet coupled to a first end of the stand, the first magnet being configured to aid in adhering the case to a magnetic object.

12. The case of claim 11, wherein when the stand is in the first position, the first magnet is positioned between the frame and the stand.

13. The case of claim 12, wherein when the stand is in the second position, the stand is positioned between the frame and the first magnet.

14. The case of claim 11, further comprising a second magnet coupled to a second end of the stand.

15. The case of claim 14, wherein when the stand is in the first position, the card holder is positioned between the first magnet and the second magnet, and when the stand is in the second position, the first magnet is positioned between the second magnet and the card holder.

16. The case of claim 1, wherein the stand is an adapter configured to receive a mechanical element.

17. The case of claim 16, wherein the mechanical element is a mechanical element of a wheelchair, a bicycle, a stroller, a scooter, or any combination thereof.

18. The case of claim 1, wherein when the stand is in the second position, the stand extends away from the frame at an angle to enable the stand to support the frame.

19. The case of claim 18, wherein the angle at which the stand extends from the frame is greater than 0 degrees and less than or equal to 180 degrees.

20. The case of claim 1, wherein when the mobile device is received in the frame and the stand is in the first position, the base of the second end of the stand covers a charging port of the mobile device.

\* \* \* \* \*